United States Patent [19]

Campbell et al.

[11] Patent Number: 4,508,359
[45] Date of Patent: Apr. 2, 1985

[54] AUTOMATIC LATCH FOR DRAFT MEMBER OF BALE HANDLER

[75] Inventors: Willis R. Campbell, Ephrata, Pa.; Larry J. Hunt, Novi, Mich.; T. William Waldrop, New Holland, Pa.

[73] Assignee: Sperry Corporation, New Holland, Pa.

[21] Appl. No.: 485,938

[22] Filed: Apr. 18, 1983

[51] Int. Cl.³ .............................................. B60D 1/00
[52] U.S. Cl. ..................................... 280/463; 414/24.5
[58] Field of Search ................... 280/462, 463, 415 R; 292/127, 227; 414/24.5

[56] References Cited

U.S. PATENT DOCUMENTS

| 1,138,516 | 5/1915 | Vesper | 292/127 X |
| 3,215,262 | 11/1965 | Fernandez et al. | 292/127 X |
| 3,952,895 | 4/1976 | Campbell | 280/463 X |
| 4,050,598 | 9/1977 | Schurz | 414/24.5 |

Primary Examiner—David M. Mitchell
Attorney, Agent, or Firm—C. Hercus Just; Frank A. Seemar; Darrell F. Marquette

[57] ABSTRACT

A mobile transport carrier for large articles of agricultural products, such as bales, including an elongated frame having an elongated draft member pivotally connected at one end to a side rail of the frame, latch mechanism carried by the draft member to secure the draft member in transport position adjacent the side rail, a fluid operated cylinder unit arranged to move the draft member toward and away from the side rail, latch releasing mechanism operable upon the initiation of movement of the fluid operated cylinder unit to effect unlatching of the latch mechanism, and latching of the latch mechanism occurring automatically when the draft member is moved to the transport position adjacent the side rail.

11 Claims, 5 Drawing Figures

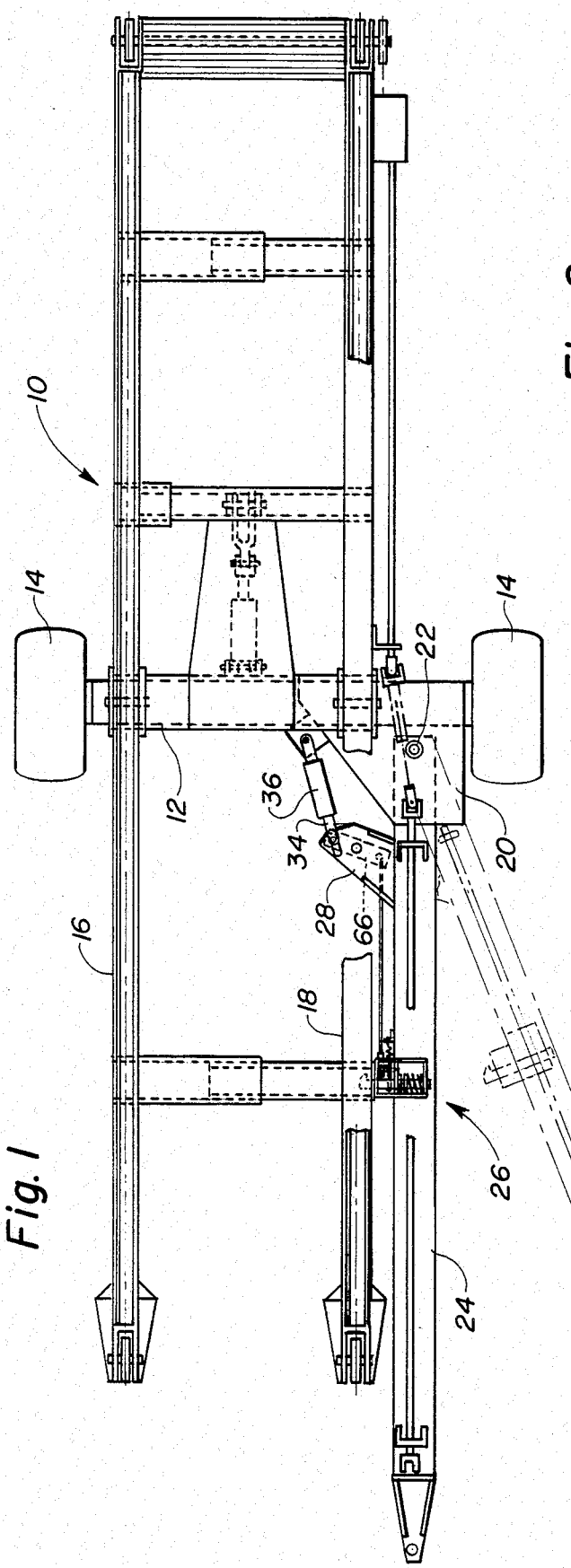
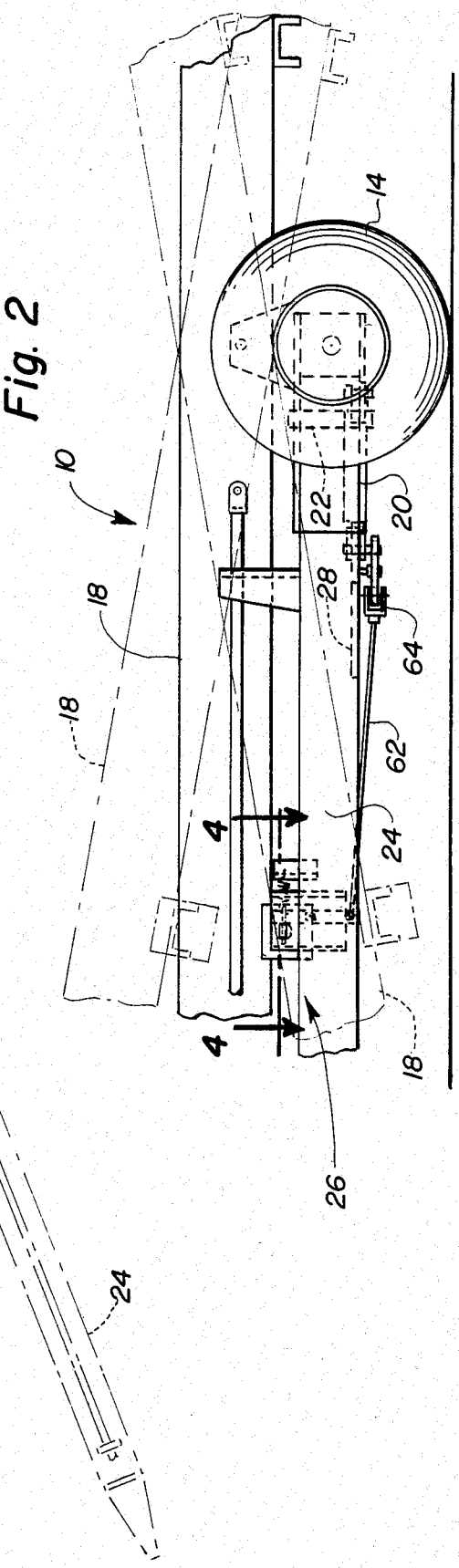

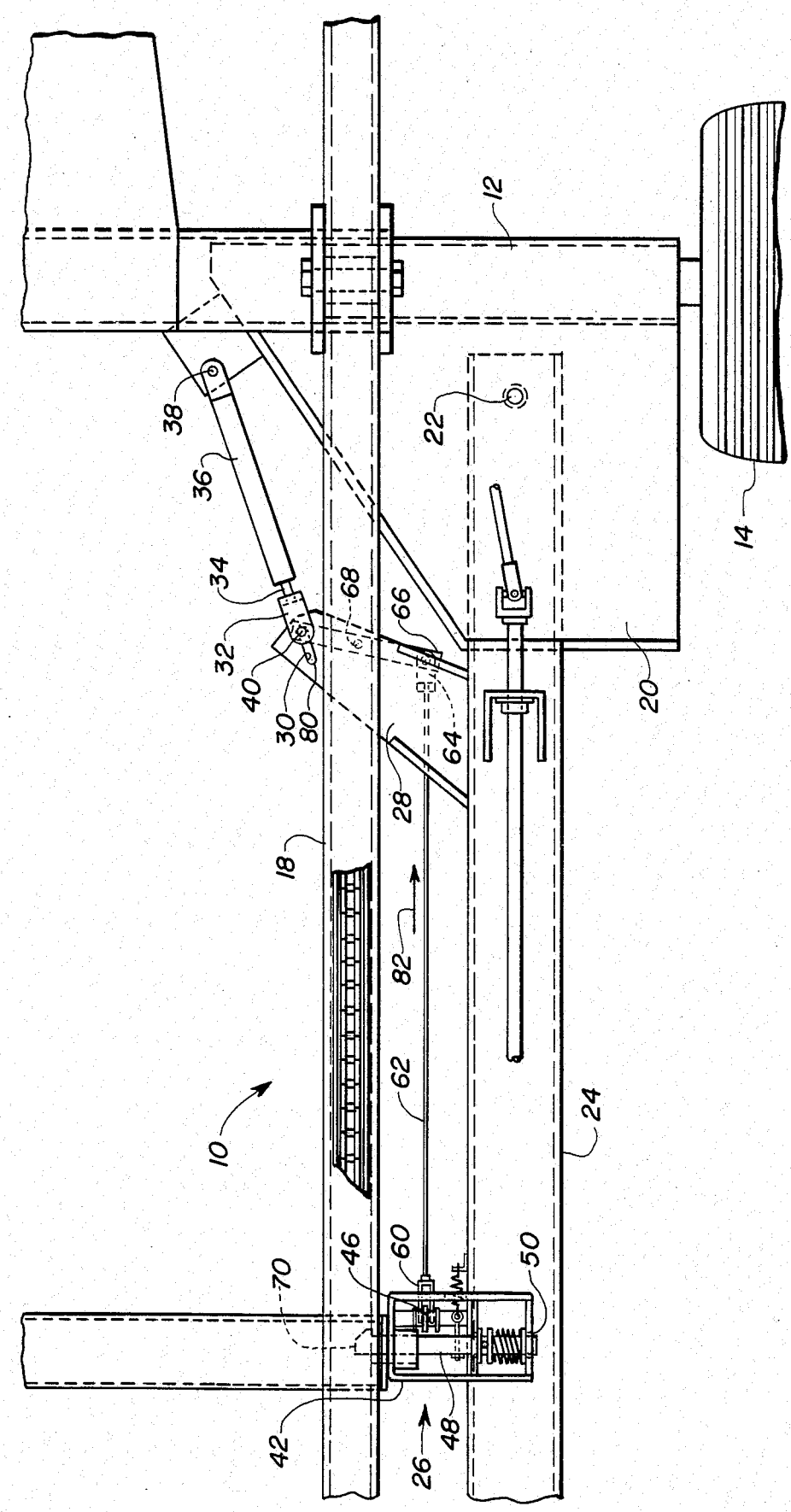

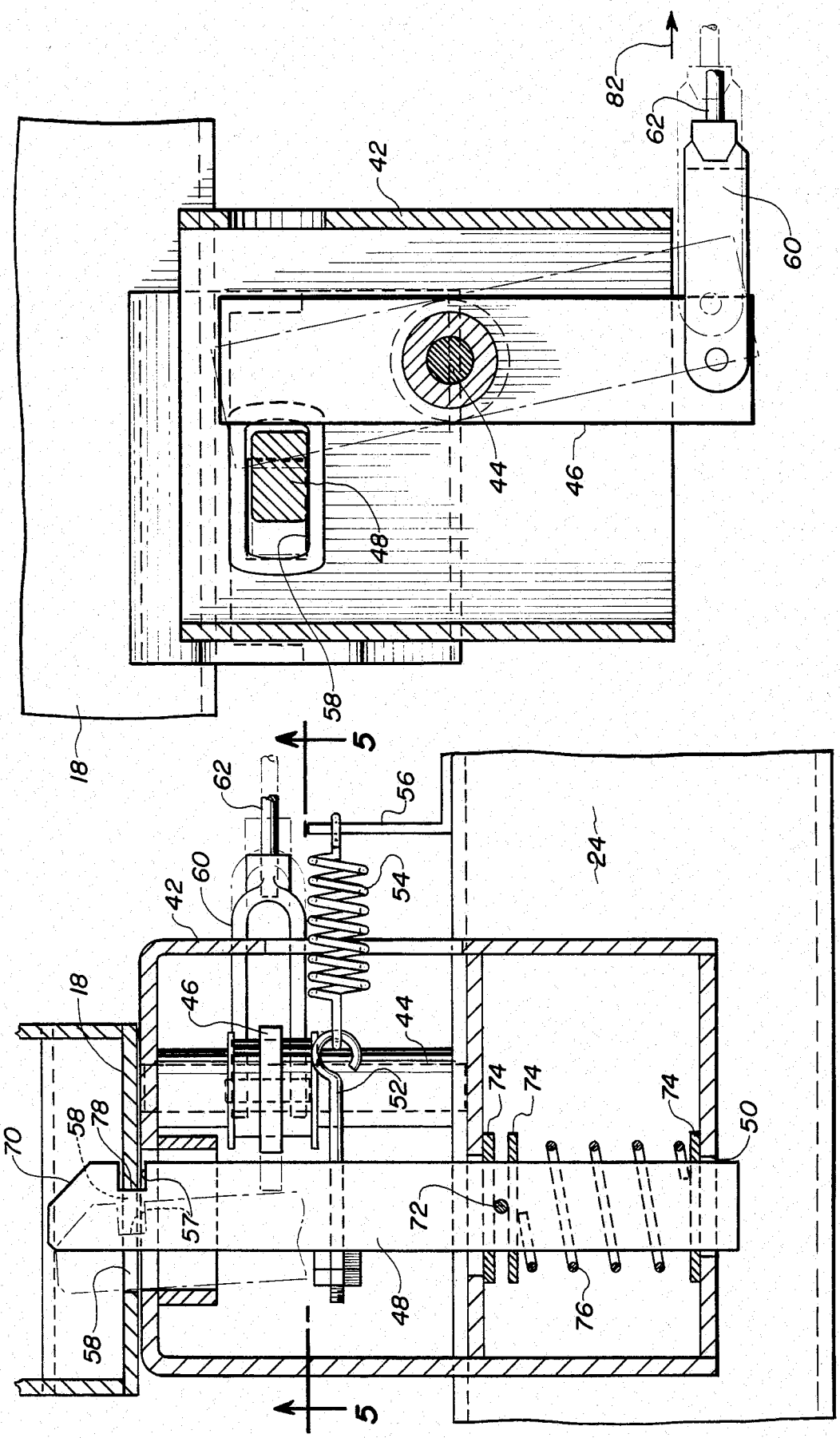

AUTOMATIC LATCH FOR DRAFT MEMBER OF BALE HANDLER

BACKGROUND OF THE INVENTION

This invention pertains to a latch mechanism for detachably securing an elongated draft member or tongue in what is known as a transport position in which the tongue is parallel to and immediately adjacent one side rail of the elongated frame of a bale handler which is capable of supporting a plurality of bales of agricultural product, such as hay and straw or the like, one of the preferred uses of the invention being for the transportation of so-called round bales. While working in a field and especially while loading such a bale handler, it is commonplace to have the draft member disposed at an angle to the frame of the handler so as to permit ready access to both ends of the frame such as when loading or unloading the bales therefrom. This is known as the so-called field position. The draft member is pivotally connected at one end to a side rail of the frame of the handler intermediately of the ends thereof.

One latch mechanism for detachably securing the draft member in the transport position adjacent and parallel to a side rail of the frame of the handler as indicated above is disclosed in prior U.S. Pat. No. 3,952,895 to Campbell, dated Apr. 27, 1976, and assigned to the assignee of the present invention. In this prior patent, there is an elongated frame on the handler which is capable of being pivoted relative to a horizontal axis located intermediately of the opposite ends of the frame so as to facilitate loading and unloading of the frame with bales. An elongated draft member is pivoted at one end to an intermediate portion of one of the side rails of the frame. A hydraulic cylinder unit is employed to move the draft member about a substantially vertical axis, toward and away from the transport position adjacent the side rail of the frame. Part of the latch mechanism comprises a spring-loaded pin projecting from the draft member and engageable in an opening in a side rail to prevent relative vertical movement between the draft member and the frame. Another part of the latch mechanism is located adjacent the vertical pivot axis for the draft member and is in the form of vertically aligned pairs of holes formed in vertically spaced apart mounting plates on the draft member and the frame adapted for insertion of a retaining pin through a pair of the aligned holes to prevent relative horizontal movement between the draft member and the frame. The insertion of the retaining pin is a separate manual operation which is both time consuming and inconvenient.

SUMMARY OF THE INVENTION

It is an object of the present invention to provide a single latch means by which a draft member is secured to a side rail of a bale handler of the type described. The latch means prevents both relative vertical and horizontal movement between the draft member and the handler. The operation of the latch means occurs automatically, without requiring any additional manual operation besides the movement of the draft member between the transport and field positions by a fluid operated cylinder unit having a piston rod movable in opposite directions to achieve such positions for the draft member.

It is another object of the invention to provide means by which the aforementioned latch means is moved to an unlatched position upon the initiation of actuation of the fluid operated cylinder unit to move the draft member from the transport position to the field position, the initiation of such movement first resulting in movement of the latch means to unlatched position, followed immediately by movement of the draft member away from the side rail, unlatching of the latch means occurring automatically incident to actuation of the fluid operated cylinder unit.

A further object of the invention is to provide lever and linkage means by which the automatic unlatching of the latch means is effected incident to the projection of the piston rod of the cylinder unit for purposes of moving the draft member from transport position to field position. The connection of the piston rod to the draft member includes a lost motion means.

Still another object of the invention ancillary to the foregoing objects is to provide the draft member with an ear extending transversely therefrom and the outer end of the piston rod of the cylinder unit carrying a pin disposed in a slot in the outer end of the ear, said slot extending substantially in a fore-and-aft direction with respect to the draft member and the pin on the outer end of the piston rod initially being in the end of the slot nearest the cylinder, whereby, upon pressure being delivered to the cylinder in a direction to project the piston rod outwardly, said pin is moved along said slot without disturbing the transport position of the draft member and during which time the lever and linkage means is actuated to move the latch means to unlatched position, followed by movement of the draft member away from the side rail when the pin on the piston rod engages the outer end of the slot.

Details of the foregoing objects by which they are achieved and a full description of the invention, as well as other objects thereof, are set forth in the following specification and illustrated in the accompanying drawings comprising a part thereof.

BRIEF DESCRIPTION OF THE DRAWINGS

FIG. 1 is a plan view of a mobile transport unit for carrying and handling large bales of agricultural products and embodying the principles of the present invention, the draft member of the unit being shown in full lines in transport position, and in phantom, the same is shown in field position.

FIG. 2 is a fragmentary side elevation showing several sloping positions of the bed of the transport unit in phantom, while in full lines, the same is shown in normal position.

FIG. 3 is a fragmentary, enlarged plan view of the latch mechanism, according to the present invention, and means for operating said mechanism and the draft member with respect to the side rail of the frame of the transport unit.

FIG. 4 is an enlarged fragmentrary horizontal plan view taken primarily on the line 4-4 of FIG. 2 and illustrating details of the latch mechanism.

FIG. 5 is a fragmentary vertical sectional view showing details of the latch mechanism and actuating means therefor as seen on the line 5-5 of FIG. 4, part of the latch actuating mechanism being shown in full lines with the latch mechanism in latching position, while in phantom, the actuating mechanism is shown in engagement with the latch mechanism that is disposed in unlatched position in phantom.

DETAILED DESCRIPTION OF THE PREFERRED EMBODIMENT

As indicated above, the basic transport structure to which the present invention pertains is substantially the same as that disclosed in aforementioned U.S. Pat. No. 3,952,895, whereby in the present description, it is submitted to be unnecessary to describe details especially of the main frame and bale moving mechanism associated therewith. For such details, attention is directed to said patent. Therefore, only as much of the transport structure as is necessary to afford a complete illustration of the present invention is set forth hereinbelow, as follows.

Referring to FIG. 1, it will be seen that an elongated frame 10 is supported on transverse beam 12 upon which conventional wheels 14 are rotatably mounted at the opposite ends thereof. At each side of the elongated frame 10 there are side rails 16 and 18 formed of suitable structural members and a frame member 20 is fixed to the beam 12 for purposes of providing and supporting a pivot shaft 22 by which one end of an elongated tongue or draft member 24 is pivotally connected so as to be supported as shown in full lines in FIG. 1 in the so-called transport position, while in phantom, the draft member 24 is shown in so-called field position in which the draft member 24 does not interfere with loading or unloading of the frame 10 which, as illustrated fragmentarily in FIG. 2, is movable pivotally about a transverse horizontal axis in various sloping directions incident to such loading and unloading operations as described in greater detail in said aforementioned patent.

The draft member 24 is formed from a suitable structural member such as a beam of appropriate cross section to provide strength and resistance to bending. Due to the length thereof, the pivot shaft 22 is only capable of preventing limited vertical movement of the draft member 24 in the absence of any latching mechanism and; accordingly, latch means 26, described in detail hereinafter, is provided for purposes of preventing both relative vertical and horizontal movement between the draft member 24 and frame 10 when the draft member 24 is in the transport position shown in full lines in FIG. 1 and also in FIG. 3.

In view of the fact that the elongated frame 10 is capable of supporting a relatively substantial number of so-called round bales, for example, the actual longitudinal dimension of the frame 10 is substantial, as is that of the draft member 24, whereby the latter in particular is reasonably heavy and for purposes of actuating the same, an ear 28 extends laterally from one side thereof and is provided with a slot 30 in the outer end which extends substantially in fore-and-aft directions with respect to the draft member 24 as best shown in FIG. 3. Ear 28 is connected to a clevis 32 fixed to the outer end of a piston rod 34 of a fluid operated cylinder unit 36. The opposite end of the cylinder unit 36 is connected to a pivot 38 fixed to the frame member 20 and it is to be understood that opposite ends of the cylinder of unit 36 are connectable by suitable flexible conduits, not shown, to a reservoir of appropriate fluid and a pump which forces the same under pressure to either selected end of the cylinder of unit 36, the pump being of conventional type and not illustrated. Also, not illustrated, is an appropriate fluid valve mounted adjacent the seat of a tractor unit, not shown, by which the mobile transport carrier is moved along a field, roads or highways and otherwise.

When the draft member 24 is secured in the latched transport position shown in full lines in FIGS. 1 and 3, the piston of the unit 36 is retracted thereinto and a pin 40 which extends through the ears of the clevis 32 and also through slot 30 is disposed in the end of the slot 30 nearest the cylinder 36, whereby it is capable of aiding in maintaining the draft member 24 in the latched position in addition to the latch per se assuming such function. However, when it is desired to project the draft member 24 about the pivot shaft 22 to the extended or field position thereof, fluid in the cylinder 36 is forced against the piston to project the piston rod 34 together with pin 40 initially along the slot 30 toward the outer end thereof, this portion of the operation being known as a "lost motion" connection which is adapted to the operation of the now to be described latch operating mechanism, as follows.

Referring particularly to FIGS. 4 and 5, it will be seen that draft member 24 shown fragmentarily therein supports a sheet metal housing 42 which is generally rectangular and extends from one side thereof toward the rail member 18, also shown frgmentarily in FIGS. 4 and 5. Housing 42 contains a horizontal short shaft 44 comprising a pivot for a first lever 46 which is shown in full lines in FIG. 5 and also in phantom in which the same engages one end of a latch member 48. One end of latch member 48 extends through a slot or opening 50 in the housing 42 and accommodates the latch member 48. Attached intermediately of the ends of the latch member 48 is a hook 52 to which one end of a tension spring 54 is connected and the opposite end of the spring 54 is connected to a fixed support 56 attached to draft member 24 as best shown in FIG. 4.

The opposite end of latch member 48 has a notch 57 therein, said end of the latch member 48 extending through a slot 58 of limited length of the outer side wall of side rail 18, the notch 57 engaging one end of the retaining means comprising slot 58 when in latched position as shown in full lines in FIG. 4 but it will be seen that the length of slot 58 is sufficient to permit movement of the notched end of the latch member 48 to unlatched position as shown in phantom in FIG. 4, against the action of spring 54.

The end of the first lever 46 which is opposite that end which engages latch member 48 is connected to another clevis 60 on one end of an elongated rod 62, and the opposite end of rod 62 is connected to a second clevis 64 through which a pin extends for pivotal connection to one end of a second lever 66 as best shown in FIG. 3. The lever 66 is pivotally connected intermediately of its ends by a pin 68 to the ear 28 as shown in FIG. 3 and the opposite end of second lever 66 is connected by pin 40 to the clevis 32 for actuation of lever 66 by the fluid operated cylinder unit 36 in the manner described hereinafter. From FIG. 4, in particular, it will also be seen that latch member 48 is provided on the notched end thereof with an angular cam surface 70. Intermediately of the ends of latch member 48 there also is a transverse pin 72, see FIG. 4, which is disposed between a pair of parellel slotted washer-like members 74. A third washer-like member 74 is disposed immediately above the slot 50 in the housing 42 and an appropriate compression spring 76 surrounds the latch member 48 and the opposite ends thereof respectively engage the lowermost member 74 and the one immediately below the pin 72 to afford a somewhat floating support for the latch member 48 without requiring an absolutely fixed pivot therefor, whereby the fulcrum slot 50 is adequate to serve as a limited pivot.

OPERATION OF THE LATCH MECHANISM

From FIG. 4, it will be seen that when the elements of the cylinder unit 36 are in the position shown in FIG. 3 with the piston compressed into the cylinder 36, the first and second levers 46 and 66 respectively are in the full line position of lever 46 shown in FIG. 5 and also in the position of lever 66 shown in FIG. 3, whereby the latch member 48 is in the full line position shown in FIG. 4 even when the draft member 24 is in the extended field position shown in phantom in FIG. 1. Accordingly, under such circumstances, the piston rod 34 will be extended and when it is desired to move the draft member 24 from the phantom position shown in FIG. 1 to the full line latched transport position also shown in FIG. 1, fluid is applied to the forward end of cyliner 36 to retract the piston rod 34 and carry with it the ear 28 and thereby move the draft member 24 to the latched transport position shown in FIG. 4. Such latching is accomplished easily by virtue of the cam surface 70 on the outer end of latch member 48 engaging the end 78 of slot 58 as shown in FIG. 4 whereby, when the upper end of housing 42, as viewed in FIG. 4, abuts the side surface of side rail 18, the notched end of latch member 48 will have been cammed aside to the phantom unlatched position thereof, against the action of the spring 54 but said spring restoring the notched end to latched position shown in FIG. 4 as soon as the notch 57 is capable of receiving the end 78 of slot 58.

For purposes of releasing the latch member 48 from the latched position when draft member 24 is in the transport position and when it is desired to move the same to field position, fluid is applied to the pivoted end of cylinder 36 to project the piston rod 34 and clevis 32 therefrom in order that the pin 40 will move to the forward end 80 of slot 30. No movement of the sraft member 24 will occur until said pin resches said forward end and meanwhile, the lost motion effect of the invention permits pin 40 to pivotally move second lever 66 counterclockwise as viewed in FIG. 3, thereby pulling rod 62 in the direction of arrow 82 and thereby also move first lever 46 counterclockwise, whereby the free, upper end thereof as viewed in FIG. 5, engages one end of the latch member 48 and moves it from the full line position shown in FIGS. 4 and 5 to the phantom, unlatched position to free the draft member 24 from being latched to the side rail 18, whereby when the pin 40 on piston rod 34 engages the forward end 80 of the slot 30, actual pivotal movement of the draft member 24 toward the extended field position thereof will occur.

From the foregoing, it will be seen that the firm latching effect of the latch member 48 relative to the slot 58 in side rail 18, when disposed in latching position, effectively prevents relative movement between the draft member 24 and the side rail 18 in both vertical and horizontal planes.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A mobile transport unit for handling large bales and like objects of crop material comprising in combination,
    (a) an elongated mobile frame adapted for transporting crop objects and having at least one side rail,
    (b) a draft member pivotally connected at one end to said mobile frame for movement between a transport position adjacent said side rail and a field position extending outward from said side rail,
    (c) fluid operated cylinder means interconnected between said draft member and said mobile frame operable to move said draft member between said field and transport positions when fluid pressure is applied respectively to opposite ends of said cylinder means,
    (d) latch means including a latch member operable to maintain said draft member against separative horizontal movement with respect to said side rail when in said transport position adjacent said side rail,
    (e) means for releasing said latch member automatically upon initial actuation of said fluid-operated cylinder means to move said draft member from said transport position toward said field position, and
    (f) said draft member having an ear mounted thereon and one end of a piston rod of said cylinder means is pivotally connected thereto with a limited amount of lost motion, whereby the initial movement of said piston rod in a direction to move said draft member away from said side rail actuates said means operable to move said latch member to said retracted position, whereby continued pressure by said cylinder means against said draft member moves said draft member toward said field position and maintains it therein.

2. The unit according to claim 1 further including elastic means normally operable to maintain said latch member in a latching position, and means operable to move said latch member to a retracted unlatched position during initiation of movement of said draft member from said transport position to said field position in opposition to the normal force of said elastic means.

3. The unit according to claim 2 in which the latch means is mounted upon the draft member and the latch member engages means carried by said side rail.

4. The unit according to claim 3 further comprising a slot in said ear extending generally in a fore-and-aft direction with respect to said side rail, and a clevis on the end of the piston rod having a pin movable in said slot, said piston rod being in a retracted position when said draft member is latched to said side rail and said pin being in the end of the slot nearest said cylinder means when said draft member is latched to said side rail, whereby initiation of projection of said piston rod moves said pin toward the opposite end of said slot to constitute said limited amount of lost motion during which movement of said latch member to said retracted unlatched position occurs before any movement of said draft member toward said field position occurs.

5. The unit according to claim 4 further including a pair of pivoted levers respectively mounted on said ear and said draft member, an elongated rod extending substantially parallel to said draft member, means connecting the opposite ends of said rod to one end of each lever, and the lever mounted upon said draft member having one end engageable with said latch member in such manner that said initial movement of the piston rod and pin thereon actuates said levers to effect movement of said latch member to said unlatched position and thereby free said draft member for movement from said side rail.

6. The unit according to claim 5 further including a housing mounted upon said draft member, a shaft in said housing pivotally supporting said lever on said draft member, said latch member also being supported within said housing and having a notched end projecting from said housing through an opening therein permitting limited movement toward and from said latching position, and said side rail having a slot therein adapted to receive said notched end of said latch member for engagement of one end of said slot with said notched end of said lever to comprise said latching position of said latch member.

7. The unit according to claim 6 in which said elastic means for said latch member comprises a tension spring extending between said housing and said latch member in a manner normally urging said latch member toward said latching position, and said latch member having a cam surface adjacent said notched end operable to cam said latch member when engaging one end of said slot during movement of said draft member toward said transport position adjacent said side rail, thereby camming said latch member relative to said slot in said side rail to permit movement of said notched end of the latch member into said slot in said side rail until said notched end engages said one end of said slot to effect latching of said draft member in said transport position and thus secure said draft member against horizontal and vertical movement relative to the frame of said mobile unit.

8. In a mobile transport unit for handling bales of crop material, said mobile transport unit having an elongated frame with a pair of side rails for supporting said bales of crop material, a draft member pivotally connected to said elongated frame and adapted for connection to a towing vehicle, said draft member being movable between a transport position adjacent one of said side rails and a field position extending outwardly from said one side rail, fluid-operated cylinder means interconnected between said draft member and said elongated frame for moving said draft member between said field and transport positions, the improvement comprising:

latch means arranged for securing said draft member against horizontal movement away from said one of said side rails when in said transport position;

means for releasing said latch means in response to initial actuation of said fluid-operated cylinder means to move said draft member from said transport position toward said field position, and one end of a piston rod of said cylinder means is pivotally connected thereto with limited amount of lost motion, whereby the initial movement of said piston rod in a direction to move said draft member away from said side rail actuates said means operable to move said latch member to said retracted position, whereby continued pressure by said cylinder mens against said draft member moves said draft member toward said field position and maintains it therein.

9. The improvement according to claim 8, wherein said latch means secures said draft member in said transport position against both vertical and horizontal movement relative to said elongated frame.

10. The improvement according to claim 9, wherein said means for releasing is connected between said latch means and said fluid operated cylinder means.

11. The improvement according to claim 10, wherein said latch means includes a latch member mounted on said draft member and engageable with retaining means on said one side rail.

* * * * *